United States Patent [19]

Epple et al.

[11] Patent Number: 5,760,153
[45] Date of Patent: Jun. 2, 1998

[54] POLAR PRESSURE-SENSITIVE ADHESIVES

[75] Inventors: Thomas C. Epple, Madison, Ohio; Carol A. Koch, San Gabriel, Calif.; Prakash Mallya, Pasadena, Calif.; Colin C. Smith, Glendale, Calif.

[73] Assignee: Avery Dennison Corporation, Pasadena, Calif.

[21] Appl. No.: 799,757

[22] Filed: Jan. 29, 1997

Related U.S. Application Data

[63] Continuation of Ser. No. 583,492, Jan. 5, 1996, abandoned, which is a continuation of Ser. No. 103,858, Aug. 9, 1993, abandoned.

[51] Int. Cl.$^6$ .................................................. C08F 20/10
[52] U.S. Cl. ...................................... 526/318; 526/320
[58] Field of Search ................................... 526/318, 320

[56] References Cited

U.S. PATENT DOCUMENTS

| Re. 27,151 | 6/1971 | Hicks | 526/318 |
|---|---|---|---|
| 3,002,959 | 10/1961 | Hicks . | |
| 3,458,466 | 7/1969 | Lee . | |
| 4,508,885 | 4/1985 | Nishiwaki et al. | 526/318 |
| 4,587,313 | 5/1986 | Ohta et al. . | |
| 4,619,964 | 10/1986 | Kielbania et al. | 526/318 |
| 5,171,768 | 12/1992 | Prentice et al. | 524/460 |
| 5,191,008 | 3/1993 | Frost et al. | 524/460 |

OTHER PUBLICATIONS

Hackh's Chemical Dictionary (May 27, 1981) p. 473.

Official Gazette—1046 TMOG 2, Sep. 4, 1984.

*Primary Examiner*—Joseph L. Schofer
*Assistant Examiner*—N. Sarofim
*Attorney, Agent, or Firm*—Christie, Parker & Hale, LLP

[57] ABSTRACT

A inherently tacky pressure-sensitive adhesive copolymer is formed by copolymerizing at least one alkyl acrylate in the presence of a positive amount up to 50 percent by weight of the monomers of a polar acrylate monomer which, when homopolymerized, have a glass transition temperature less than 50° C.

15 Claims, No Drawings

POLAR PRESSURE-SENSITIVE ADHESIVES

CROSS-REFERENCE TO RELATED APPLICATION

This is a continuation of application Ser. No. 08/583,492, filed Jan. 5, 1996, now abandoned, which is a Continuation of application Ser. No. 08/103,858, filed Aug. 9, 1993, now abandoned.

FIELD OF THE INVENTION

The invention is directed to inherently tacky acrylic-based pressure-sensitive adhesive polymers that contain a high level of polymerized relatively low glass transition temperature acrylic monomers with carboxyl or hydroxyl functionality, the polymers exhibiting a high levels of adhesion to stainless steel and automotive paints with excellent resistance to hydrocarbon solvents.

BACKGROUND OF THE INVENTION

Acid containing monomers are commonly used in acrylic pressure-sensitive adhesives (PSAs) to increase cohesive properties via cross-linking. Their use, however, has been limited to low to moderate concentrations, i.e., 10% or less, since high acid levels lead to an adverse increase in the glass transition temperature and storage modulus to a point where the polymers begin to lose their PSA properties.

Several patents, each of which is incorporated herein by reference, disclose the use of acrylic polymers of high carboxylic acid content to increase cohesive strength.

U.S. Pat. No. 4,404,246 describes the use of 10 to 25% acrylic acid, methacrylic acid, or itaconic acid in combination with a lower alkoxylated amino formaldehyde as a latent cross-linking agent. The compositions are uncross-linked prior to heating which induces cure leading to high peel and shear, especially at elevated temperatures.

U.S. Pat. No. 4,737,410 discloses an uncross-linked blend of an acrylic polymer containing up to 30% polar monomers having hydroxyl, carboxylic, sulphonic acid, or phosphonic acid functionalities in combination with a polyalkyloxazoline. The increased polarity of the acrylic polymer serves to improve compatibility with the polyalkyloxazolines. A disclosed carboxylic comonomer is a carboxyethylacrylate. The polyalkyloxazoline obviates the need for cross-linking to improve cohesive strength.

U.S. Pat. No. 3,677,985 describes PSAs containing 2 to 25 percent by weight of an acrylic monomer with reactive sites such as hydroxyl or carboxyl combined with tackifying resins that also contain reactive sites and a coupling agent such as a metal salt to couple the tackifier to the resin. This tackified system does not display solvent (gasoline) resistance.

The following patents, incorporated herein by reference, deal with increased adhesion to automotive paint.

U.S. Pat. No. 4,364,972 describes an acrylic PSA containing 15 to 50% N-vinyl-2-pyrrolidone.

U.S. Pat. No. 4,726,982 describes an acrylic adhesive containing 10 to 40% N-vinyl lactam blended with a tackifying resin.

The following patents or patent disclosures, each incorporated herein by reference, relate attempts to modify pressure-sensitive adhesives in order to improve solvent resistance.

U.S. Pat. Nos. 3,718,712 and 3,767,040 disclose the use cross-linked polyurethanes and urethane cyclic terpene tackifiers.

EP 75191 describes the use of fluorinated acrylates to give good oil and water resistance.

U.S. Pat. No. 3,356,635 deals with chlorinated elastomers combined with a urethane elastomer and a chlorinated tackifying resin.

U.S. Pat. No. 4,725,641 describes the use of polyetheresteramides and polyetheresterurethanes in rubber based adhesives to improve gasoline resistance.

U.S. Pat. No. 4,294,936 discloses blends of thermoplastic block copolymers, polyesters and tackifying resins.

None of these patents and patent disclosures disclose the use of acid functionalized acrylic monomers to increase the solvent resistance of pressure-sensitive adhesives.

SUMMARY OF THE INVENTION

The present invention is directed to inherently tacky acrylic copolymers formed by polymerization of a mixture of monomers comprising from about 55 to about 90% by weight of an alkyl acrylate containing at least four carbon atoms in the alkyl group, about 0.1 to about 15% by weight of an unsaturated carboxylic acid and from 1 to 50% by weight, preferably from about 15 to about 35% by weight, of a polar acrylate monomer of the formula:

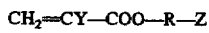

$$CH_2=CY-COO-R-Z$$

wherein R is an alkyl, cycloalkyl, aromatic, alkyl ester group or an alkyl ether group containing up to about 12 carbon atoms, Y is hydrogen or methyl and Z is a carboxyl (COOH) or hydroxyl ($CH_2OH$) group, said polar acrylate monomer when homopolymerized having a glass transition temperature (Tg) less than about 50° C., said copolymer having a glass transition temperature of at least 10° C. below use temperature.

The polymers are preferably synthesized in solution typically using a solvent such as a mixture of methanol and ethylacetate. The solids content during polymerization is typically in the range of about 40% to about 60% solids to achieve a copolymer having functionally useful molecular weight and viscosity. Polymerization is in the presence of free radical initiator such as an azonitrile or peroxide. Ionic cross-linking agents such as aluminum acetyl acetonate can be used to cross-link the polymers or coating. The polymers can also be cross-linked using electron beam or actinic radiation.

The alkyl acrylate monomers are preferably one or more alkyl acrylates containing from about 4 to about 8 carbon atoms in the alkyl group. The preferred alkyl acrylates are 2-ethyl hexyl acrylate, isooctyl acrylate and butyl acrylate. Methacrylate esters may be substituted for a portion of the alkyl acrylate.

The preferred carboxylic acid is acrylic acid. The preferred polar acrylic monomer is beta-carboxyethylacrylate.

Polymerization may occur in the presence of a vinyl ester such as vinyl acetate, and one or more diesters of a dicarboxylic acid or other modifying monomers.

The presently preferred acrylic copolymer are copolymers of 2-ethyl hexyl acrylate, acrylic acid and beta carboxyethyl acrylate.

The PSA copolymers of the instant invention are inherently tacky and display a high level of adhesion to stainless steel and automotive paints and excellent gasoline resistance as determined by standard test methods. The absence of a carboxylic acid in the copolymer enhances peel performance at the sacrifice in shear. The carboxylic acids promote ambient and 70° C. shear as well as SAFT values.

DETAILED DESCRIPTION

The pressure-sensitive adhesive polymers of the present invention are made by copolymerizing an acrylate ester monomer system which comprises a polar acrylate monomer present in an amount from about 1 to about 50% by weight of the monomers, said polar acrylate monomer being of the formula:

$$CH_2=CYCOO-R-Z$$

wherein Y is hydrogen or methyl, R is an alkyl, cycloalkyl, aromatic, alkyl ester group or an alkyl ether containing up to about 12 carbon atoms. The alkyl esters may be and are preferably formed of repeating ethoxy or propoxy group. The polar acrylate monomers when homopolymerized have a glass transition temperature of less than 50° C., preferably less than 30° C. The polymers have a glass transition of at least 10° C. below use temperature, preferably from about 0 to about −60° C. as determined by differential scanning calorimeter (DSC).

The copolymers are preferably synthesized by conventional free radical techniques in a solvent using a mixture of methanol and ethylacetate. Bulk and, for monomer systems of low acid content, suspension and emulsion polymerization may also be employed.

The monomer mixture preferably includes unsaturated carboxylic acids containing from 3 to about 5 carbon atoms preferably acrylic acid.

The polymer may include other monomers such as vinyl acetate, dioctyl fumarate or maleate, styrene and the like which can be used to further modify glass transition temperature and other polymer properties.

As used herein, the phrase "use temperature" is the temperature at which the adhesive is normally bonded to a substrate. Use temperature is normally ambient (25°) but may be 0° C. or less for low temperature applications and higher than 25° C. for high temperature applications.

The acrylic-based copolymers of the instant invention may contain, on a percent-by-weight basis, from about 55 to about 90 percent-by-weight of the total copolymer of one or more alkyl acrylates containing at least 4 preferably from about 4 to about 8 carbon atoms in the alkyl group. Useful alkyl acrylate include n-butyl acrylate, 2-ethylhexyl acrylate, isooctyl acrylate, and the like, with 2-ethylhexyl acrylate being preferred.

Alkyl methacrylates such as 2-ethyhexyl methacrylate, butyl methacrylate, isooctyl methacrylate and the like may be substitutes for a portion of the alkylacrylate in forming the soft, low Tg portion of the copolymer.

As useful polar acrylate comonomers there may be mentioned beta-carboxyethylacrylate, mono-2-acryloyl-oxypropyl succinate, polypropylene glycol monomethacrylate and the like. The polar acrylate co-monomers are present in an amount of from about 1 to about 50% by weight of the monomers, preferably from about 5 to about 35% by weight of the monomers, more preferably from about 15 to about 30% by weight of the monomers.

It is preferred to incorporate in the monomers from about 0.1 to about 15% by weight of the monomers of one or more unsaturated carboxylic acids containing from 3 to about 5 carbon atoms. The unsaturated carboxylic acids include, among others, acrylic acid, methacrylic acid, itaconic acid, and the like. Acrylic acid is presently preferred.

Modifying monomers which may also be present includes one or more vinyl esters. Representative of the vinyl esters there may be mentioned vinyl acetate, vinyl butyrate, vinyl propionate, vinyl isobutyrate, vinyl valerate, vinyl versitate, and the like. Vinyl acetate is preferred.

Another modifying component of the acrylic backbone polymer is one or more diesters of a dicarboxylic acid wherein each ester group of the diester acid independently contains from about 8 to about 16, preferably from about 8 to about 12, carbon atoms. Examples of diesters are di-2-ethyl hexyl maleate, di-2-ethyl hexyl fumarate and mixtures thereof.

Other comonomers, such as methyl acrylate, methyl methacrylate, styrene and the like, could be used to modify the Tg of the copolymer properties.

Polar comonomers, such as N-vinyl pyrrolidone, N-vinyl caprolactam, hydroxyethyl(propyl) (meth)acrylate, acetoacetoxyethyl (meth)acrylate, and the like, could be used to further enhance adhesion to various surfaces. Other comonomers, such as glycidyl methacrylate or allyl glycidyl ether, could be used to further enhance high temperature shear properties.

Presently preferred polymers are copolymers of 2-ethylhexyl acrylate, beta-carboxyethyl acrylate and acrylic acid.

Chemical cross-linkers provided in an amount of up to 2.0% by weight, preferably from about 0.1 to 0.5% by weight, can be effectively used to further increase cohesive strength. Aluminum acetyl acetonate (AAA) is the preferred chemical cross-linking agent. Cross-linking can also be achieved using actinic or electron beam radiation.

The copolymers of the instant invention can be stabilized against UV and oxidative degradation by using UV stabilizers and antioxidants.

In addition to fillers, colorants and the like, tackifiers, plasticizers and oils may be added to modify the properties of the polar acrylic polymers of this invention.

The monomer proportions of the acrylic polymer are adjusted in such a way that has a glass transition temperature of least 10° C. below use temperature and preferably 0° C. to about −60° C. as measured by a differential scanning calorimeter.

The polymers of this invention give a good balance of adhesion and tack at room temperature and low temperatures with excellent adhesion to stainless steel and automotive paints. The untackified and unplasticized polymers exhibit excellent gasoline resistance with the carboxylic acids enhancing ambient and 70° C. sheer and SAFT values at some sacrifice in peel. Addition of a plasticizer or tackifier can further modify adhesive properties with some sacrifice in hydrocarbon resistance.

Applications include exterior graphic applications such as automotive pinstriping, fleet marking, stone guard protection, body side molding and the like.

The following test procedures were followed in the collection of data for the Examples and Controls:

180° Peel Test

Samples are cut in 2.54×20 cm test strips which are rolled down on TNO painted test panels with a 2 kg rubber-clad steel roller at a rate of 30 cm/min. After a dwell time of 24 hr at standard testing laboratory conditions, the test strips are peeled away from the test panel using an Instron tensile tester at 180° to the test panel, i.e., folded back on itself and parallel to the surface of the panel, at a rate of 30 cm/min. The force to remove the adhesive test strip from the test panel is measured in Newtons per meter (N/m). Tests are performed in triplicate. A TNO panel is a standard polyester melamine automotive lacquer painted panel provided by Toegepast Natuurweten Schappelyk Onderzoek, Netherlands.

Gasoline Resistance Test

Peel adhesion after immersion in ASTM B fluid is considered to be a measure of the resistance of the PSA construction to gasoline. This is measured identically to the 180° peel adhesion test on TNO painted panels, except that after the dwell time of 24 hrs, the sample on the panel is immersed in ASTM B fluid consisting of 70% by volume 2,2,4-trimethylpentane and 30% by volume toluene for a period of one hour. The sample is then allowed to dry for one hour at room temperature and the 180° peel adhesion is measured. Tests are performed in triplicate.

Shear Tests

Samples of the film are cut in 1.25 cm ×5 cm strips and applied covering a 1.25×1.25 cm area of a stainless steel panel. The film is rolled down twice using a 2 kg rubber-clad steel roller at a rate of 30 cm/min. The panel is then clamped in a vertical position with a 500 g weight attached to the end of the strip. The time elapsed before the weight pulls the sample from the panel is measured in minutes. This shear test is conducted at room temperature or in an oven at elevated temperatures such as 70° C. Tests were performed in triplicate.

The SHEAR Adhesive Failure Test (SAFT) test is a test where the adhesive is applied to 1"×0.5"overlap on stainless steels to which a 4.5 lb roll force is applied. After dwell of 24 hours, this is placed in an oven and a 500 g load is applied under shear conditions and temperature raised from 40° C. to 200° C. at the rate of 1° C. per minute. The failure temperature is recorded as the shear adhesion failure temperature. This is a measure of the cohesive strength of the adhesive or the ability of the adhesive to maintain a bond at elevated temperatures.

Percent Insolubles

The percent insolubles (PI) test determines the portion of the sample which is insoluble in ASTM B fluid. An adhesive with a high percent insolubles will be more resistant to gasoline than will an adhesive with a low percent insolubles. The adhesive is coated on a silicon release liner and dried at 70° C. for 10 min. The adhesive is then removed from the release liner and a small amount, 75 mgs, is accurately weighed and placed in a 10 micrometer polytetrafluoroethylene, PTFE, membrane filter. The edges of the filter are thermally sealed to contain the sample and the filter is placed in a small vial containing ASTM B fluid. The vial is agitated for 48 hrs, then the filter is taken out of the solvent and dried at elevated temperature for 20 min. The filter is weighed and the resulting weight of the sample is used to calculate the percent insolubles as follows:

$$\% PI = \frac{\text{final weight of sample}}{\text{initial weight of sample}} \times 100$$

EXAMPLE 1

A monomer mixture of 272 g 2-ethylhexylacrylate, 100 g beta-carboxyethylacrylate from UCB Radcure, and 28 g acrylic acid was prepared. 100 g of the mixture added to a 2 liter glass reactor fitted with a reflux condenser and agitator and flushed with nitrogen gas. 34 g of methanol, and 34 g ethylacetate, were added to the reactor and the initial charge heated to a reflux temperature of 70° C. with stirring. An initiator solution of 0.15 g Vazo 64, in 10ml ethylacetate, was then added. After 15 min., the monomer feed (the remaining monomers, 130 g methanol, 130 g ethylacetate, and 0.45 g Vazo 64) was added to the reactor over a period of 3 hours. One hour after the monomer feed was complete, Vazo 64, 0.26 g in 10 ml ethylacetate was added and the polymer was allowed to react one hour before adding a second portion of 0.26 g Vazo 64 in 10ml ethylacetate. One hour later, the polymer was cooled to room temperature and a mixture of 0.25ml methanol and 12 ml ethyl acetate was added to reduce the solids to 44%. The viscosity using Brookfield viscometer spindle LV No. 3 at 3 rpm was 24,000 cps.

The rheological properties of the copolymer of Example 1 with an acid content 40.4 mole percent, as compared to a 2-EHA/AA copolymer containing 29.4 mole percent acid, reveals that in spite of the significantly higher acid content, the copolymer has a lower Tg, 4.5° vs. 7.5° C., and a similar plateau modulus.

Table 1 compares the PSA properties of the copolymer to the 2-EHA/AA copolymer and cross-linked Polytex 7000 commercial acrylic PSA manufactured by AV Chemie. The copolymer of Example 1 had high peel adhesion to two types of automotive painted panels. It also showed consistently higher peel after immersion of ASTM B fluid, an indication of improved solvent resistance which is supported by the percent insolubles test in toluene.

EXAMPLES 2 to 24 AND CONTROL

Table 2 shows various compositions of the polymer containing from 0 to 10% acrylic acid, from 20 to 35% beta-carboxyethylacrylate, and the remainder 2-ethylhexylacrylate. These polymers were cross-linked with 0.1, 0.2 or 0.3% AAA. They were coated on silver vinyl and tested for 100% peel adhesion to TNO painted panels before and after immersion in ASTM B fluid, as well as room temperature shear (RTS). All of the high acid polymers showed increased adhesion to painted panel and improved gasoline resistance compared to the cross-linked Polytex 7000. Room temperature shear varied depending on the level of cross-linker and can be as high as 10,000 minutes.

The increased insolubility in hydrocarbon solvents is also supported by the PI tests shown in Table 3. These two examples show insolubility (high gel content) in ASTM B fluid before and after cross-linking. They also show high insolubles after cross-linking in an isooctane, toluene, methanol mixture as well as in tetrahydrofuran.

Elevated temperature shear (ETS) was also tested at various cross-linker levels. This is shown in Table 4. At 0.3% AAA the adhesives show excellent ETS at 70° C.

TABLE 1

| Sample | Example I | Polytex 7000 | 2-EHA/AA |
|---|---|---|---|
|  |  |  | 85/15 |
| AAA, % | 0.176 | 0.3 | 0.15 |
| gel in toluene, % | 90 | 70 | — |
| RTS 1 kg, min | 2623 | 10000+ | 10000+ |
| RTS 500 g, min | 10000+ | 10000+ | — |
| 70° C. Shear, min | 10000+ | 10000+ | — |
| SAFT, °C. | >200 | >175 | — |
| Mylar Facestock with Stainless Steel Panel |  |  |  |
| coat weight, gsm | 30 | 35 | 33 |
| 180° Peel, 24 hr, N/m | 1017 | 800 | 1000 |
| Silver Vinyl Facestock with TNO Panel |  |  |  |
| coat weight, gsm | 30 | 29 | 29 |
| 180° Peel, 24 hr, N/m | 1004 | 715 | 850 |
| ASTM B Immersion Test | 444 | 202 | 428 |

TABLE 1-continued

| Sample | Example I | Polytex 7000 | 2-EHA/AA |
|---|---|---|---|
| White Vinyl Facestock with Ford Panel | | | |
| coat weight, gsm | 32 | 31 | 45 |
| 180° Peel, 72 hr, N/m | 696 | 528 | 719 |
| ASTM B Immersion Test | 333 | 150 | 213 |

TABLE 2

| Example | β-CEA | AA | 2-EHA | AAA | Test min. | 180° Peel Test N/m | Gasoline Resistance N/m |
|---|---|---|---|---|---|---|---|
| 2 | 34.9 | 0 | 65 | 0.1 | 268 | 1015 | 487 |
| 3 | 24.8 | 10 | 65 | 0.2 | 4336 | 912 | 437 |
| 4 | 28 | 6.7 | 65 | 0.3 | 10,000+ | 857 | 393 |
| 5 | 20 | 5 | 74.8 | 0.2 | 789 | 924 | 365 |
| 6 | 20 | 10 | 69.9 | 0.1 | 1378 | 826 | 424 |
| 7 | 24.9 | 5 | 69.9 | 0.2 | 1847 | 806 | 397 |
| 8 | 27.2 | 0 | 72.5 | 0.3 | 2677 | 816 | 279 |
| 9 | 20 | 0 | 79.9 | 0.1 | 28.8 | 975 | 643 |
| 10 | 34.7 | 0 | 65 | 0.3 | 1420 | 734 | 377 |
| 11 | 28.3 | 6.6 | 65 | 0.1 | 794 | 850 | 413 |
| 12 | 20 | 10 | 69.7 | 0.3 | 10,000+ | 830 | 354 |
| 13 | 20 | 0 | 79.7 | 0.3 | 578 | 831 | 263 |
| 14 | 27.3 | 0 | 72.6 | 0.1 | 189 | 1008 | 469 |
| 15 | 25 | 2.5 | 72.3 | 0.2 | 840 | 984 | 380 |
| 16 | 30 | 2.5 | 67.3 | 0.2 | 2490 | 937 | 399 |
| Polytex 7000 | — | — | — | 0.3 | 10,000+ | 720 | 255 |

RTS = ½ × ½ × 500 g
180° Peel = 24 hr dwell to TNO panel
Immersion Test = 24 hr dwell on TNO panel, followed by 1 hr immersion in ASTM B and 1 hr recovery

TABLE 3

| Example | β-CEA | AA | AAA | PI in ASTM B | PI in Mix | PI in THF |
|---|---|---|---|---|---|---|
| 17 | 24 | 8 | 0 | 96 | 4 | 4 |
| 18 | 24 | 8 | 0.2 | 99 | 31 | 64 |
| 19 | 29 | 4 | 0 | 98 | 5 | 4 |
| 20 | 29 | 4 | 0.2 | 91 | 85 | 81 |

Mix = 17:17:6, iso-octane, toluene, methanol

TABLE 4

| Example | β-CEA | AA | AAA | RTS, min. 500 g | ETS, min. 250 g | ETS, min. 500 g |
|---|---|---|---|---|---|---|
| 21 | 24 | 8 | 0.2 | 4300 | 250 | — |
| 22 | 24 | 8 | 0.3 | 30,000+ | 30,000+ | 30,000+ |
| 23 | 29 | 4 | 0.2 | 1900 | 200 | — |
| 24 | 29 | 4 | 0.3 | 8000 | 30,000+ | 30,000+ |

EXAMPLE 25

To 90 parts adhesive of Example 1 there was added 10 parts of a 3:1 blend of the tackifiers Sylvatac 100 NS from Arizona Chemical and Pentalyn H from Hercules crosslinked with 0.5% AAA. The resultant pressure-sensitive adhesive was coated as a double coated tape onto a 3.7 mil black polyester. When applied to a computer diskette, the adhesive passed a subjective push-off test at initial dwell for a computer diskette A-ring application.

What is claimed is:

1. A high polar acrylate content pressure-sensitive adhesive copolymer exhibiting resistance to gasoline and adhesion to stainless steel and automotive paints formed by copolymerizing an acrylic monomer mixture comprising at least one alkyl acrylate containing from about 4 to about 8 carbon atoms in the alkyl group in the presence of from 1 to about 50 percent by weight of the acrylic monomer mixture of a polar acrylate monomer of the formula:

$$CH_2=CYCOO-R-Z$$

wherein Y is selected from the group consisting of hydrogen and methyl, R is selected from the group consisting of alkyl, cycloalkyl, aromatic, alkyl ester and alkyl ether and containing from 2 to about 12 carbon atoms, and Z is selected from the group consisting of solely COOH and $CH_2OH$, with the proviso that R contains at least 2 carbon atoms when Z is solely COOH and R contains from at least 5 carbon atoms when Z is solely $CH_2OH$, said monomer, when homopolymerized having a glass transition temperature of less than about 50° C., in an admixture with from about 0.1 or to about 15% by weight of at lest one unsaturated carboxylic acid containing from 3 to about 5 carbon atoms, said copolymer having a glass transition temperature of at least 10° C. below use temperature and when crosslinked at least 90% insoluble in ASTM B fluid.

2. A pressure-sensitive adhesive copolymer as claimed in claim 1 in which the copolymer has a glass transition temperature of from about 0 to about −60° C.

3. A pressure-sensitive adhesive copolymer as claimed in claim 1 in which the acrylic monomer system comprises from about 55 to about 90 percent by weight alkyl acrylate and in which the polar acrylate monomer is present in an amount of from about 15 to about 35 percent by weight.

4. A pressure-sensitive copolymer as claimed in claim 1 in which the acrylic monomer mixture comprises from about 55 to about 90 percent by weight alkyl acrylate in which the carboxylated acrylate monomer is present in an amount of from about 15 to about 35 percent by weight.

5. A pressure-sensitive copolymer as claimed in claim 1 in which the alkyl acrylate is selected from the group consisting of 2-ethylhexyl acrylate, isooctyl acrylate and butylacrylate.

6. A pressure-sensitive copolymer as claimed in claim 2 in which the alkyl acrylate is selected from the group consisting of 2-ethylhexyl acrylate, isooctyl acrylate and butylacylate.

7. A pressure-sensitive copolymer as claimed in claim 4 in which the alkyl acrylate is selected from the group consisting of 2-ethylhexyl acrylate, isooctyl acrylate and butylacylate.

8. A pressure-sensitive adhesive copolymer as claimed in claim 1 in which the polar acrylate co-monomer is beta-carboxyethyl acrylate.

9. A pressure-sensitive adhesive copolymer as claimed in claim 2 in which the polar acrylate co-monomer is beta-carboxyethyl acrylate.

10. A pressure-sensitive adhesive copolymer as claimed in claim 7 in which the polar acrylate co-monomer is beta-carboxyethyl acrylate.

11. A pressure-sensitive adhesive as claimed in claim 1 in combination with at least one tackifier.

12. A pressure-sensitive adhesive as claimed in claim 1 in combination with at least one tackifier.

13. A pressure-sensitive adhesive copolymer formed by copolymerizing an acrylic monomer mixture comprising from about 55 to about 90% percent by weight 2-ethyl hexyl acrylate, from 1 to about 50% by weight of the monomers of beta carboxyethyl acrylate, from 0 to about 15 percent by weight acrylic acid, said copolymer having a glass transition temperature of at least 10° C. below use temperature.

14. A pressure-sensitive adhesive copolymer as claimed in claim 13 in which the copolymer has a glass transition temperature of from about 0° to about −60° C.

15. A pressure-sensitive adhesive copolymer as claimed in claim 14 in combination with at least one tackifier.

* * * * *

UNITED STATES PATENT AND TRADEMARK OFFICE
CERTIFICATE OF CORRECTION

PATENT NO. : 5,760,153
DATED : June 2, 1998
INVENTOR(S) : Thomas C. Epple; Carol A. Koch; Prakash Mallya; Colin C. Smith It is certified that error appears in the above-indentified patent and that said Letters Patent is hereby corrected as shown below:

On the cover page,

[56] References Cited, under "U.S. Patent Documents" insert the following:

| Number | Date | Name | Class |
|---|---|---|---|
| 2,220,930 |  | Kraus | 260/94 |
| 3,002,959 | 10/1961 | Hicks | 260/88.1 |
| 3,356,635 | 12/1967 | Heer | 260/32.8 |
| 3,458,466 | 7/1969 | Lee | 260/29.6 |
| 3,677,985 | 7/1972 | Sirota et al. | 260/27 |
| 3,718,712 | 2/1973 | Tushaus | 260/858 |
| 3,767,040 | 10/1973 | Tushaus | 206/59 |
| 4,010,40 | 3/1977 | Bulard et al | 526/185 |
| 4,294,936 | 10/1981 | Korpman | 525/93 |
| 4,364,972 | 12/1982 | Moon | 427/54.1 |
| 4,404,246 | 9/1983 | Charbonneau et al. | 428/212 |
| 4,508,885 | 4/1985 | Nishiwaki et al | 526/318 |
| 4,725,641 | 2/1988 | Comert et al | 524/460 |
| 4,726,982 | 2/1988 | Traynor et al | 428/213 |
| 4,737,410 | 4/1988 | Kantner | 428/343 |
| 5,191,008 | 3/1993 | Frost et al | 524/460 |
| 5,250,644 | 10/1993 | Tokynaga et al | 526/318 |

Under "Foreign Patent Documents" insert the following:

| Number | Date | Country | Name | Class |
|---|---|---|---|---|
| 0075191 | 3/1983 | EPO |  |  |
| 6145623 | 5/1994 | JA | Sekisui | 526/318 |
| 2036772 | 7/1980 | U.K. | Piestert | 526/318 |
| 54138034 | 10/1979 | JA | Saiden | 526/318 |
| 0036294 | 9/1981 | EP | Rohm & Haas | 526/318 |
| 503886 | 3/1976 | SU | Kaza | 526/185 |

UNITED STATES PATENT AND TRADEMARK OFFICE
CERTIFICATE OF CORRECTION

PATENT NO. : 5,760,153
DATED : June 2, 1998
INVENTOR(S) : Thomas C. Epple; Carol A. Koch; Prakash Mallya; Colin C. Smith It is certified that error appears in the above-indentified patent and that said Letters Patent is hereby corrected as shown below:

Under "Other Publications" insert the following:
"Medical adhesive sheet based on acrylic polymer," JP93-212840; 8/93, Takatera et al. (Abstract)(p.3).
"Room-temperature-curable two-component adhesives," JP03146582; 6/91 Heisei p. 31 (abstract) (p.31).
"A novel method for the production of crosslinked acrylate contact adhesives," Lohmann, Journal (1991), 35(4), 13-15 (abstract)(p.32).
"Two-component water-based adhesives with good storage stability," Jp02251589; 10/90 Heisei (abstract page 33).
Two-pack water-based pressure-sensitive adhesives," JP01069681, 3/89 Heisei (abstract pages 39-40).
"Methods for coating adhesives on moldings," JP62181380, 8/87 Shaua (abstract page 43).

Abstract, line 1, replace "A inherently tacky" with -- An inherently tacky --.
Column 1, line 16, change "levels" to -- level --.
Column 1, line 66, before "cross-linked" insert -- of --.
Column 2, line 36, after "copolymer having"insert -- a --.
Column 2, line 54, replace "The presently preferred" to
          -- Presently preferred --.
Column 2, line 54, replace "acrylic copolymer" with -- acrylic copolymers --.
Column 3, line 9, after "The alkyl esters may" insert -- be --.
Column 3, line 13, after "glass transition" insert -- temperature --.
Column 3, line 23, after "about 5 carbon atoms" insert a comma.
Column 3, line 42, change "ethyhexyl" to -- ethylhexyl".

UNITED STATES PATENT AND TRADEMARK OFFICE
CERTIFICATE OF CORRECTION

PATENT NO. : 5,760,153
DATED : June 2, 1998
INVENTOR(S) : Thomas C. Epple; Carol A. Koch; Prakash Mallya; Colin C. Smith It is certified that error appears in the above-indentified patent and that said Letters Patent is hereby corrected as shown below:

Column 3, line 49, replace "co-monomers" with -- comonomers --.
Column 3, line 60, change "includes" to -- include --.
Column 4, line 31, after "way that" insert -- the copolymer --.
Column 4, line 32, replace "of least 10° C." with -- of at least 10° C. --.
Column 8, line 47, replace "lest" with -- least --.
Column 8, line 59, after "A pressure-sensitive" insert -- adhesive --.
Column 8, line 61, after "alkyl acrylate" insert -- and --.
Column 8, line 62, replace "carboxylated acrylate" with -- polar acrylate --.
Column 8, line 65, after "A pressure-sensitive" insert -- adhesive --.
Column 9, line 1, after "A pressure-sensitive" insert -- adhesive --.
Column 9, lines 3,4, replace "butylacylate" with -- butylacrylate --.
Column 9, line 5, after "A pressure-sensitive" insert -- adhesive --.
Column 9, lines 7,8, replace "butylacylate" with -- butylacrylate --.
Column 9, line 10, replace "co-monomer" with -- monomer --.
Column 9, line 13, replace "co-monomer" with -- monomer --.
Column 9, line 16, replace "co-monomer" with -- monomer --.

UNITED STATES PATENT AND TRADEMARK OFFICE
CERTIFICATE OF CORRECTION

PATENT NO. : 5,760,153
DATED : June 2, 1998
INVENTOR(S) : Thomas C. Epple; Carol A. Koch; Prakash Mallya; Colin C. Smith It is certified that error appears in the above-indentified patent and that said Letters Patent is hereby corrected as shown below:

Column 10, line 3, replace "as claimed in claim 1" with
 -- as claimed in claim 2 --.
Column 10, line 7, after "90%" delete "percent".
Column 10, line 9, after "carboxyethyl acrylate," insert -- and --.

Signed and Sealed this

Eleventh Day of May, 1999

Attest:

Q. TODD DICKINSON

*Attesting Officer*  *Acting Commissioner of Patents and Trademarks*